Patented Apr. 6, 1948

2,439,103

UNITED STATES PATENT OFFICE 2,439,103

CELLULOSE ESTER MELT-COATING COMPOSITION

Martin Salo and Harold F. Vivian, Rochester, N. Y., assignors to Eastman Kodak Company, Rochester, N. Y., a corporation of New Jersey No Drawing. Application March 8, 1946, Serial No. 653,171

9 Claims. (Cl. 106—181)

1

This invention relates to coating compositions of high butyryl cellulose esters and di-2-ethyl hexyl sebacate, said compositions being suitable for application in a molten condition, known as hot melts.

Cellulose-derivative compositions have been employed heretofore in the coating of paper, cloth, metal, and the like by dissolving in an organic solvent and forming a layer upon the surface to be coated, whereupon the solvent was evaporated. Although this method has found quite extensive use, it has involved the handling of organic solvents and solvent recovery systems to reclaim the vapors which have been given off from the coating. Also, these coating processes have necessitated a long period of curing, thereby adding to the complexity of the process.

Other methods of coating have been suggested, such as by lamination or by applying a hot melt to a surface. For the hot melt-coating procedure, some compositions have been recommended but up until quite recently, none of these compositions used organic acid esters of cellulose to any substantial extent, particularly where the acyl of the cellulose ester was composed of lower fatty acid radicles. With many of the hot melt-coating compositions, there have been various features which were undesirable, such as tackiness, extraordinary softness, opaqueness, brittleness, or the like, and, consequently, for the application of cellulose ester coatings up until quite recently volatile solvent solutions were still employed for various purposes.

Recently cellulose ester compositions have been mentioned as suitable for hot melt-coating processes. Those compositions, however, involve the use of a mixture of high boiling plasticizers to modify the cellulose ester. In none of the cases previously described have hot melt compositions using a single plasticizer with the cellulose ester been disclosed which were free from tackiness and blocking and which were sharply setting upon cooling. With the use of some types of single plasticizers, the hot melt coatings resulting therefrom were of a tacky character and would block in storage. With other types of plasticizers the molten cellulose ester coating did not set sharply upon cooling. To overcome these difficulties mixtures of plasticizers of different types have been heretofore used for melt-coating compositions to impart a non-tacky, non-blocking, and sharp-setting character to the resulting coatings. It is desirable in melt-coating operations that the plasticizer employed should have good solvent power for the cellulose ester at an elevated temperature, but poor or no solvent power at normal temperatures, such as below 100° F. The plasticizer, however, should be compatible with the cellulose ester at normal temperature. In this way rapid-setting, non-blocking, non-exuding, coatings can be obtained.

One object of our invention is to provide a novel cellulose ester composition using only a single plasticizer, which is of value as a non-blocking melt-coating composition to make possible the coating of surfaces without the use of a volatile solvent. Another object of our invention is to provide a practicable melt-coating composition which gives hard moistureproof coatings free of tackiness, brittleness, and opaqueness. A further object of our invention is to provide a composition which in use in melt-coating operations goes through a gel state at a fairly high temperature, such as 120–140° C. characterized by sudden setting upon cooling from the melting temperature which is highly desirable in obtaining a highly valuable product. A still further object of our invention is to provide a melt-coating composition of good characteristics using only a single plasticizer with a cellulose ester.

We have found that all of the characteristics set out may be obtained in compositions which are specifically limited as to the type of cellulose ester, the plasticizer employed, and the proportion of the plasticizer which is employed. We have found that compositions of high butyryl cellulose esters as prescribed herein, mixed with di-2-ethyl hexyl sebacate or dicapryl sebacate within a certain range of proportions exhibit highly desirable properties for melt-coating purposes in contrast to the commonly held opinion regarding cellulose ester compositions. The compositions of our invention consist of high butyryl cellulose esters of a certain limited type, mixed with di-2-ethyl hexyl sebacate as will be described in more detail hereinafter. The cellulose esters which form one of the constituents of the compositions in accordance with our invention are cellulose esters having a butyryl content of at least 40% and which have been hydrolyzed no more than a small extent. The hydrolyzing, even though to a small extent, is desirable, however, to increase the heat stability of the esters. Generally, however, the cellulose esters should have no more than two hydroxyl groups per twenty-four cellulose carbon atoms. If the ester employed is substantially a triester, it is necessary that it be a stable cellulose compound. The cellulose esters which have been found to be most suitable for use in our invention are those cellulose esters having a butyryl content of at least 40%, the remainder of the acyl being acetyl. Ordinarily, the presence of no more than 10% of acetyl is desired. If any other acyl than butyryl is employed, it is desirable that it be in a sufficiently small amount that it does not influence the character of the cellulose ester. The cellulose ester may be a cellulose butyrate, a cellulose acetate butyrate, a cellulose propionate butyrate, or a butyric acid ester of cellulose having a few per cent of some acyl groups higher than butyryl, providing those groups do not influence the character of the cellulose ester. The butyric acid esters of cellulose which are suitable for forming the compositions in accordance with our invention take in but a very small portion of the field of the butyric acid esters of cellulose. It is preferable that the acyl groups present in the ester are those of fatty acids of no more than four carbon atoms, which esters will be referred to herein as lower fatty acid esters of cellulose.

The butyric acid esters of cellulose which are suitable for use in the compositions of our invention are still further restricted as to various other characteristics. The butyric acid esters which are useful for our compositions must have a melting point of less than 200° C., a char point of at least 260° C., and preferably 300° C., and a fundamental cuprammonium viscosity of not more than 10 centipoises, and preferably of not more than 5 centipoises. The esters which are suitable for use in melt-coating compositions in accordance with our invention have an acetone viscosity within the range of 5–200 centipoises, this being the viscosity of one part of ester dissolved in 9 parts of acetone at a temperature of 25° C. To aid in the selection of the cellulose ester having optimum properties in a melt-coating composition, it may be stated that in the case of the cellulose esters having butyryl contents in the lower part of the range given, such as from 40–47% butyryl, the best results are obtained when those esters which have little or no hydroxyl therein, but the ester must be heat stable. With esters of this butyryl content, compositions having the best fluidity are obtained with the near fully esterified type esters. With esters having a butyryl content of 47–50%, for example, a further degree of hydrolyzing is permissible to give compositions of good fluidity.

The proportion of di-2-ethyl hexyl sebacate or dicapryl sebacate which is most useful is 15–50% of the total composition. Ordinarily, proportions within the range of 15–35% are useful. However, the proportion of plasticizer should be adjusted to correspond to the ester with which it is being used and to the purpose for which it is employed. For instance, with the lowest viscosity cellulose esters, such as those having a viscosity of 5–10 centipoises in 10% acetone solution, 15 parts of plasticizer may be employed to obtain a good melt-coating composition. With an ester of higher viscosity, such as 25–50 centipoises, it is desirable to use 25% of plasticizer in the melt-coating compositions formed therefrom. With esters having a viscosity approaching 100 centipoises, it is desirable to employ 35% of plasticizer in the melt-coating compositions formed therefrom. Ordinarily, for melt-coating processes, it is desirable to use esters having not much more than 100 centipoises viscosity. Esters, however, having a higher viscosity than this and which consequently require a high amount of plasticizer are useful for some purposes, such as where a porous web is to be coated or, for instance, in a process in which paper is to be impregnated with the melt-coating composition. With those esters, such as where the viscosity is approaching 200 centipoises, it is desirable to use as much as 50% plasticizer in the melt-coating compositions prepared therefrom. In the coating of surfaces which are impervious, however, it is ordinarily desirable to employ the lower viscosity cellulose esters in the melt-coating compositions useful therefor as fluidity is obtained therewith with proportions of plasticizer in the lower portion of the range given.

Di-2-ethyl hexyl sebacate and dicapryl sebacate are sebacic acid esters of di-2-ethyl hexyl alcohol and octanol-2 respectively. These esters may be prepared by the commonly employed methods of preparing esters from an organic acid and an alcohol.

The plasticizer proportions which have been given herein are those which are suitable for carrying out a melt-coating process at melting temperatures around 160 or 170° C., which are particularly desirable in the coating of paper, in which a temperature of about 170° C. is the maximum which can be used without breakdown or some other effect upon the paper sheet. Obviously, if a higher temperature of operation is used, less plasticizer is needed than specified herein in order to impart the desired fluidity to the composition. Another reason why keeping the temperature of the melt down is desirable is that this aids in maintaining the stability of the composition in the melt-coating operation. For instance, if the melt-coating composition is kept at a temperature of 170° C. for eight to ten hours or possibly longer, there is some tendency toward discoloration, although with esters of good stability and high char point, this effect is reduced to a minimum. It is often desirable, however, if the composition is to be used under severe conditions to add a very small proportion (such as on the order of 1%) of an anti-oxidant, such as hydroquinone to the composition. Also, it is desirable to avoid having present in the composition any material which will discolor or decompose when subjected to the elevated temperature used, for a long period of time.

The compositions in accordance with our invention may be obtained by mixing the cellulose esters in comminuted form into the plasticizer at a temperature of about 150–170° C. It is preferred that the cellulose ester be finely divided, such as may be obtained by a ballmilling operation. As intimate mixing of the cellulose ester and plasticizer is necessary, stirring is desirable in the formation of the composition. One procedure by which our composition may be made and used for melt coating is to intimately mix the cellulose ester with the plasticizer, followed by passing the resulting composition between heated compounding rolls, thereby causing a softening or melting together of the ingredients. After forming a heavy sheet or film, it may then be broken up into small granules, which granules may be conveniently stored. For coating, the granules may be melted in a heated extrusion apparatus or heated mixing equipment of suitable design and fed into a melt-coating machine, particularly one which operates in a continuous manner. In this way the composition is not kept in a melted condition for a very long period of time prior to coating, and it is therefore unnecessary to store large quantities of composition in a molten condition.

The object of the melt-coating operation is to obtain a coated material in which the coating has a somewhat stable structure. In this way a moisture-proof non-tacky sheet may be obtained. As was pointed out above, our invention is particularly directed to enabling the melt coating of paper in which a temperature of not more than 170° C. is employed in the coating operation. The paper which is coated may be either an ordinary paper, such as kraft or a higher refined paper, such as prepared from high alpha-cellulose.

The classical methods of coating devised for all types of viscous compositions can be used with these hot melt compositions, providing the apparatus can be heated to the point necessary to keep the melt adequately fluid. The coating methods can be divided into four categories, namely, the knife, the roll, the casting, and extrusion methods.

Roll coating which to date seems the most practical for melt-coating operations can be divided into the following types: contact, squeeze, and rotogravure methods. In all of the roll coating methods the coating after application onto a web is in rough form and must be polished or smoothed, such as by passing the coated web over a heated bar of a special design or over a heated roll rotating in a direction opposite to that of the web.

In the contact method of roll coating a common design is one which employs two heated rolls rotating in opposite directions, one above the other, the lower one of which picks up the molten composition from a heated hopper and meters it to the top roll over which the web is passed. The coating is then picked up by the web, which in turn passes over a smoothing apparatus, such as a heated bar, following which the coated web passes over cooling rolls to harden the coating. The apparatus must be heated, such as with oil, Dowtherm, or directly by electrical heaters. Coating apparatus of this type is described in B. C. Miller and John Waldron Corporation U. S. Patents Nos. 2,070,563, 2,117,199, 2,117,200, 2,189,758, 2,190,843, and 2,214,787. These machines can be adapted to squeeze roll coating by passing the web between the two coating rolls instead of over the top roll as in the contact coating method. With the squeeze roll method it is possible to coat both sides of the web simultaneously if the melt is provided for the top of the paper by a suitable hopper on the top roll and to the bottom roll by the regular hopper described in the contact method. In addition, smoothing apparatus for both sides must be provided.

The cellulose esters which are employed in our compositions are prepared by reacting upon cellulose with butyric anhydride, preferably after a presoaking or pretreatment of the cellulose with a small amount of acetic acid. For instance, with a pretreatment, such as described and claimed in Malm Patents Nos. 2,342,415 and 2,342,416, the cellulose is activated using only a small proportion of acetic acid. Methods of esterifying cellulose using butyric anhydride and catalyst are described and claimed in Blanchard Patent No. 2,304,792 and in Malm Patents Nos. 2,362,576 and 2,345,406, which esterification results in a high butyryl cellulose ester. The ester may then be hydrolyzed preferably for no more than a sufficient time to reduce the sulfur content of the ester.

The cellulose esters which we prefer to use in compositions in accordance with our invention are those which have been stabilized. Methods of stabilizing cellulose esters suitable for use here are described and claimed in Malm and Kirton Patent No. 2,250,201 or in Malm and Crane Patent No. 2,346,498. The esters after properly stabilizing by methods of this nature have a char point of at least 260° and usually 300° C. or more, and a melting point considerably below the char point. Compositions in accordance with our invention in which these esters are used may be subjected to melting temperatures for the time necessary to perform coating operations without detrimentally affecting the composition. Little, if any, additional materials should be mixed with coating compositions in accordance with our invention. Obviously, if colored coatings are desired, a very small proportion of dye might be incorporated therein.

The compositions in accordance with our invention are characterized by sharp setting characteristics even though the proportion of plasticizer employed may be as much as that of the cellulose ester used. Compositions were prepared of various cellulose acetate butyrates coming within the terms of the description herein using equal parts of cellulose ester and of di-2-ethyl hexyl sebacate. These compositions were tested for solubility at 180° C., followed by cooling to 100° C., and 25° C. It was found that in all cases the cellulose ester was soluble at 180° C. but set or gelled when the temperature dropped to 100° C. Also, at 25° C. the composition remained gelled. In no one of these cases where cooling took place was there any loss of compatibility between the cellulose ester and the plasticizer, even though gelling occurred.

|   | Per cent Butyryl | Per cent Acetyl | Appearance at— | | |
|---|---|---|---|---|---|
|   |   |   | 180° C. | 100° C. | 25° C. |
| 1 | 40 | 13 | Clear fluid melt | Clear gel | Clear gel. |
| 2 | 44.3 | 5.8 | do | do | Do. |
| 3 | 46.3 | 6.8 | do | do | Do. |
| 4 | 50.6 | 7.3 | do | do | Do. |
| 5 | 52.9 | 1.1 | do | do | Do. |

The compositions after testing for solubility were subjected to cooling to —10° C., and the compositions were stored at this temperature for approximately seventeen hours. Even under these conditions the melts remained transparent showing that there was compatibility of the cellulose ester and the plasticizer at —10° C. This data, however, only holds true with butyric acid esters of cellulose having a butyryl content of at least 40%.

The following examples illustrate our invention:

*Example 1.*—A melt was prepared by heating together at 160° C. 21 parts of di-2-ethyl hexyl sebacate and 79 parts of a cellulose acetate butyrate having a butyryl content of 48.1%, an acetyl content of 6.9%, and a viscosity of 22 centipoises at 25° C. in a 10% solution in acetone. These compositions were melt coated at 170° C. onto a high alpha-cellulose paper. The melt viscosity at 170° C. was 284 poises. A clear coating was obtained which was satisfactory for blocking and did not exhibit tackiness even at a temperature of 150° F.

*Example 2.*—A melt coating composition was prepared by stirring together 32 parts of di-2-ethyl hexyl sebacate and 68 parts of cellulose acetate butyrate having a butyryl content of approximately 48%, an acetyl content of approximately 7%, and a 22 centipoises viscosity. This composition was used for melt coating onto paper. The melt viscosity at 170° C. was 66 poises. The resulting coating was clear, free of tackiness, and had good non-blocking characteristics.

*Example 3.*—A composition of dicapryl sebacate and cellulose acetate butyrate was prepared in the same manner and with the same proportions as in the preceding example. The resulting composition was melt coated at 170° C. onto paper and gave a paper having a clear coating free from tackiness and blocking.

*Example 4.*—A composition was prepared by stirring together at 160° C. 42 parts of di-2-ethyl hexyl sebacate and 58 parts of a high butyryl cellulose acetate butyrate. The composition was then melt coated upon an unsized water absorbable paper on both sides at 170° C. The resulting product was found to be free of blocking and tackiness, and a clear coating was obtained. The coating was found to prevent the penetration of water into the paper which had been coated.

Instead of paper other flexible sheet materials, particularly fabrics may be coated as described in the examples. Cotton fabrics may be readily coated in accordance with our invention to form sheeting of good quality. Also, other fabrics, such as silk or linen may be coated to give a high moisture-resistant product. If desired, paper or cloth, particularly if porous, may be impregnated with the composition in accordance with out invention by employing a pressing operation with heated rolls after the coating has been applied to the paper. This operation will convert an opaque paper into one having translucent characteristics which is desirable for some photographic products. Paper coated in accordance with our invention is especially useful as a base for photographic paper for quick processing because the paper is protected from absorption of water and chemicals by this coating operation.

We claim:

1. A cellulose web having on at least one of its surfaces a melt coating essentially consisting of a cellulose acetate butyrate having a butyryl content of at least 40%, a melting point of less than 200° C., a char point of at least 260° C., a cuprammonium viscosity of not more than 10 centipoises, and an acetone viscosity of 5–200 centipoises and 15–50% of di-2-ethyl hexyl sebacate.

2. Paper having a coating thereon essentially consisting of a cellulose acetate butyrate having a butyryl content of 47–50%, a melting point of less than 200° C., a char point of at least 260° C., a cuprammonium viscosity of not more than 10 centipoises, and an acetone viscosity of 5–200 centipoises and 15–50% of di-2-ethyl hexyl sebacate.

3. A non-blocking hot melt-coating composition essentially consisting of approximately 80 parts of a cellulose acetate butyrate having a butyryl content of 47–50% and an acetone viscosity of 20–25 centipoises and approximately 20 parts of di-2-ethyl hexyl sebacate, the composition being adapted when applied from a molten condition to give a non-tacky abrasion-resistant coating.

4. A non-blocking hot melt-coating composition essentially consisting of approximately 70 parts of a heat-stable high butyryl cellulose ester and approximately 30 parts of di-2-ethyl hexyl sebacate, the composition being adapted when applied from a molten condition to give a non-tacky abrasion-resistant coating.

5. A non-blocking hot melt-coating composition essentially consisting of 85–50% of a cellulose ester having a butyryl content of at least 40%, not more than 2 hydroxyl groups per 24 cellulose carbon atoms, a melting point of less than 200° C., a char point of at least 260° C., a cuprammonium viscosity of not more than 10 centipoises, and an acetone viscosity of 5–200 centipoises, and 15–50% of a plasticizer essentially consisting of di-2-ethyl hexyl sebacate, the composition being adapted when applied from a molten condition to give a non-tacky, abrasion-resistant coating.

6. A non-blocking hot melt-coating composition essentially consisting of 85–50% of a cellulose acetate butyrate having a butyryl content of at least 40%, not more than 2 hydroxyl groups per 24 cellulose carbon atoms, a melting point of less than 200° C., a char point of at least 260° C., a cuprammonium viscosity of not more than 10 centipoises, and an acetone viscosity of 5–200 centipoises, and 15–50% of a plasticizer essentially consisting of di-2-ethyl hexyl sebacate, the composition being adapted when applied from a molten condition to give a non-tacky, abrasion-resistant coating.

7. A non-blocking hot melt-coating composition essentially consisting of 85–50% of a cellulose acetate butyrate having a butyryl content of 47–50%, not more than 2 hydroxyl groups per 24 cellulose carbon atoms, a melting point of less than 200° C., a char point of at least 260° C., a cuprammonium viscosity of not more than 10 centipoises, and an acetone viscosity of 5–200 centipoises, and 15–50% of a plasticizer essentially consisting of di-2-ethyl hexyl sebacate, the composition being adapted when applied from a molten condition to give a non-tacky, abrasion-resistant coating.

8. A non-blocking hot melt-coating composition essentially consisting of 85–50% of a cellulose ester having a butyryl content of at least 40%, not more than 2 hydroxyl groups per 24 cellulose carbon atoms, a melting point of less than 200° C., a char point of at least 260° C., a cuprammonium viscosity of not more than 10 centipoises, and an acetone viscosity of 5–200 centipoises, an antioxidant, and 15–50% of a plasticizer essentially consisting of di-2-ethyl hexyl sebacate, the composition being adapted when applied from a molten condition to give a non-tacky, abrasion-resistant coating.

9. A non-blocking hot melt-coating composition essentially consisting of 85–65% of a cellulose ester having a butyryl content of 47–50%, not more than two hydroxyl groups per 24 cellulose carbon atoms, a melting point of less than 200° C., a char point of at least 260° C., a cuprammonium viscosity of not more than 10 centipoises, and an acetone viscosity of 5–100 centipoises, and 15–35% of a plasticizer essentially consisting of di-2-ethyl hexyl sebacate, the composition being adapted when applied from a molten condition to give a non-tacky, abrasion-resistant coating.

MARTIN SALO.
HAROLD F. VIVIAN.

REFERENCES CITED

The following references are of record in the file of this patent:

UNITED STATES PATENTS

| Number | Name | Date |
|---|---|---|
| 1,942,843 | Smith | Jan. 9, 1934 |
| 2,032,679 | Wickert | Mar. 3, 1936 |
| 2,098,534 | Charch | Nov. 9, 1937 |
| 2,117,827 | Smith | May 17, 1938 |
| 2,387,773 | Salo et al. | Oct. 30, 1945 |